US012753645B2

(12) United States Patent
Windhövel et al.

(10) Patent No.: US 12,753,645 B2
(45) Date of Patent: Oct. 6, 2026

(54) KINEMATICS ASSEMBLY

(71) Applicant: kabkin GmbH & Co. KG, Ennepetal (DE)

(72) Inventors: Chris Windhövel, Düsseldorf (DE); Marc Oldiges, Wuppertal (DE); Jan-Patrik Diekmann, Gevelsberg (DE)

(73) Assignee: kabkin GmbH & Co. KG, Ennepetal (DE)

( * ) Notice: Subject to any disclaimer, the term of this patent is extended or adjusted under 35 U.S.C. 154(b) by 0 days.

(21) Appl. No.: 18/546,789

(22) PCT Filed: Feb. 18, 2022

(86) PCT No.: PCT/EP2022/054162
§ 371 (c)(1),
(2) Date: Aug. 17, 2023

(87) PCT Pub. No.: WO2022/175497
PCT Pub. Date: Aug. 25, 2022

(65) Prior Publication Data

US 2024/0368930 A1 Nov. 7, 2024

(30) Foreign Application Priority Data

Feb. 18, 2021 (DE) ..................... 10 2021 000 835.9

(51) Int. Cl.
*E05D 3/16* (2006.01)

(52) U.S. Cl.
CPC .......... *E05D 3/16* (2013.01); *E05D 2003/166* (2013.01); *E05Y 2600/41* (2013.01); *E05Y 2800/41* (2013.01)

(58) Field of Classification Search
CPC .................... E05D 2003/163; E05D 2003/166
See application file for complete search history.

(56) References Cited

U.S. PATENT DOCUMENTS 542,250 A * 7/1895 Gilman ..................... E05D 3/16 16/370
879,067 A * 2/1908 Rodman ................... E05D 3/16 16/369

(Continued)

FOREIGN PATENT DOCUMENTS

DE 709 753 C 8/1941
DE 810966 C 8/1951

(Continued)

OTHER PUBLICATIONS

International Search Report of corresponding PCT/EP2022/054162, with translation, mailed Jun. 15, 2022.

*Primary Examiner* — Jeffrey O'Brien
(74) *Attorney, Agent, or Firm* — LEASON ELLIS LLP

(57) ABSTRACT

The invention relates to a hinge (1) for connecting a movable part (T) to another part (R), wherein the hinge (1) has four levers (2, 3, 4, 5) with seven points of rotation (25, 26, 27, 28, 29, 30, 31), and six (25, 26, 27, 28, 30, 31) of the seven points of rotation (25, 26, 27, 28, 29, 30, 31) are arranged axially symmetrically in relation to a mirror axis (S), which runs through one (29) of the seven points of rotation (25, 26, 27, 28, 29, 30, 31), and two (25, 26) of the six symmetrically arranged points of rotation (25, 26, 27, 28, 30, 31) can be fixed on the movable part, and two (27, 28) of the six symmetrically arranged points of rotation (25, 26, 27, 28, 30, 31) can be fixed on the other part, in each case by means of an attachment (6), and the attachments (6) secure the relative position of the in each case two points of rotation (25, 26; 27, 28) in relation to one another, and one (25) of the two points of rotation (25, 26) secured by means of a first of the two attachments (6) is connected, by means of one lever (3) of the four levers (2, 3, 4, 5), to one (30) of the two symmetrically arranged points of rotation (30, 31) which are present outside the attachment (6), and the other (26) of the (Continued)

two points of rotation (25, 26) secured by means of the first attachment (6) is connected, by means of a further lever (5) of the four levers (2, 3, 4, 5), to the other one (31) of the two symmetrically arranged points of rotation (30, 31) which are present outside the attachments (6), wherein the further lever (5) also incorporates the point of rotation (29), through which the mirror axis (S) runs, wherein, in the closed state, there is an enclosed angle of less than 155° between a connecting line between the point of rotation (29) having the mirror axis (S) and a point of rotation (31) outside the attachments (6) and a connecting line between the point of rotation (29) having the mirror axis and the point of rotation (26) at the attachment (6) for a lever (5).

13 Claims, 21 Drawing Sheets

(56) References Cited

U.S. PATENT DOCUMENTS

| | | | | | |
|---|---|---|---|---|---|
| 1,030,936 | A * | 7/1912 | Soss | E05D 3/16 | 16/369 |
| 1,269,403 | A * | 6/1918 | Dianvoszky | E05D 3/16 | 16/369 |
| 1,410,052 | A * | 3/1922 | Bobek | E05D 3/16 | 16/368 |
| 1,697,801 | A * | 1/1929 | Walter | E05D 3/16 | 12/142 EV |
| 1,797,802 | A * | 3/1931 | Soss | E05D 3/16 | 16/369 |
| 1,984,092 | A * | 12/1934 | Soss | E05D 3/16 | 16/369 |
| 2,021,702 | A * | 11/1935 | Soss | E05D 3/16 | 16/369 |
| 2,135,280 | A * | 11/1938 | Erickson | E05D 3/16 | 16/369 |
| 2,157,027 | A * | 5/1939 | Soss | E05D 3/16 | 16/250 |
| 2,200,142 | A * | 5/1940 | Witschi | E05D 3/16 | 16/369 |
| 2,694,216 | A * | 11/1954 | Schnur | E05D 3/16 | 16/369 |
| 3,001,224 | A * | 9/1961 | Soss | E05D 3/16 | 16/379 |
| 4,817,241 | A * | 4/1989 | Koch | E05D 7/0415 | 16/370 |
| 5,035,026 | A * | 7/1991 | Carlo | E05D 3/16 | 16/302 |
| 7,197,790 | B1 * | 4/2007 | Edmondson | E05F 1/1292 | 16/370 |
| 7,350,273 | B1 * | 4/2008 | Skipper | E05D 3/16 | 16/369 |
| 8,599,546 | B2 * | 12/2013 | Nagasaki | G06F 1/1681 | 16/322 |
| 8,656,623 | B1 * | 2/2014 | Chvala | F41C 23/04 | 42/73 |
| 2019/0071905 | A1 * | 3/2019 | Migliorini | E05D 9/00 | |
| 2023/0383786 | A1 * | 11/2023 | Ren | E05D 3/16 | |

FOREIGN PATENT DOCUMENTS

| | | | | |
|---|---|---|---|---|
| DE | 60003494 T2 * | 5/2004 | | |
| EP | 1939381 A2 * | 7/2008 | | E05D 3/186 |
| EP | 1754848 B1 * | 2/2011 | | E05D 3/186 |
| FR | 772 468 A | 10/1934 | | |
| JP | H0718288 B2 | 3/1995 | | |

* cited by examiner

Fig. 4A
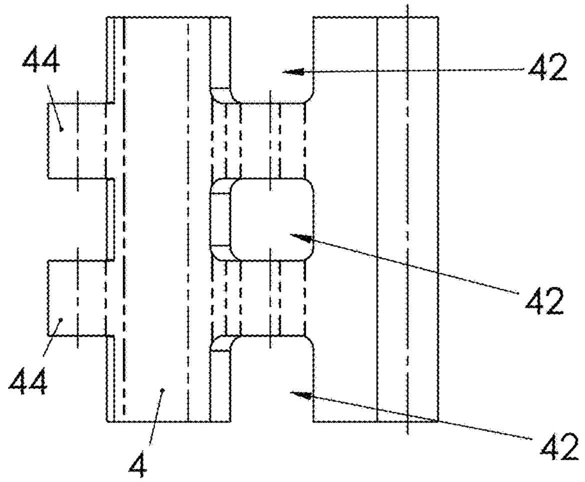
Fig. 4B
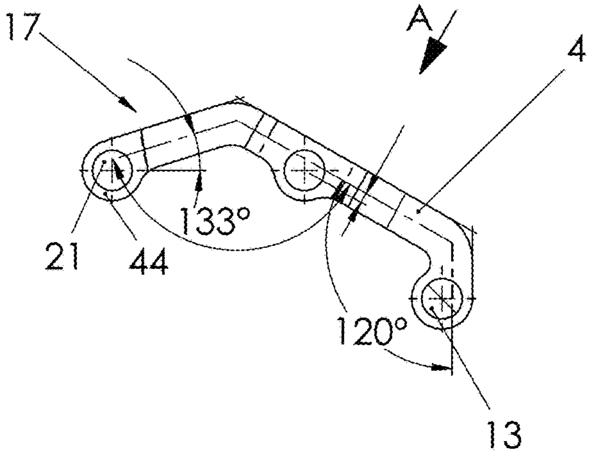
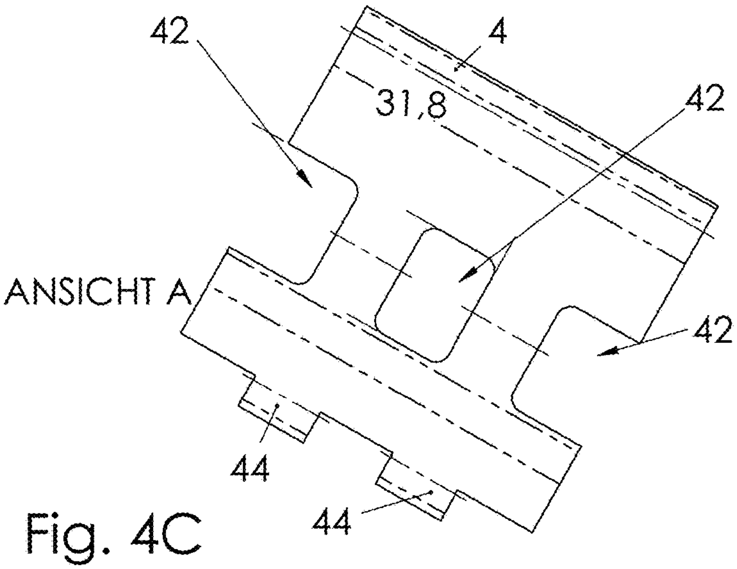
Fig. 4C
Fig. 4D
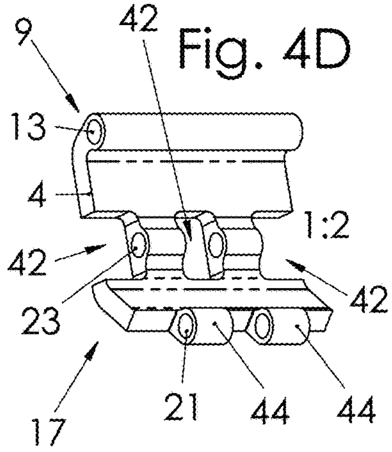

Door open,
front view

Door open,
side view,
detail

Door closed, plan view, sectional representation

Door closed, plan view, sectional representation detail

Door closed, front view

Door closed,
front view,
detail

KINEMATICS ASSEMBLY

The invention relates in general to a hinge and in particular to a translational and/or rotational kinematics assembly for realizing a defined motion path, wherein in this case in particular a complex combined-rotational kinematics assembly for realizing a defined motion path is considered.

The term "hinge" as used herein may also be replaced synonymously by the term "kinematics assembly for the realization of a motion path", whereby the motion path may in particular be defined or predetermined. A hinge or a kinematics assembly within the meaning of the description comprises an element which enables one part (movable part) to be moved relative to another part (fixed part), wherein in particular the movement path can be specified (in a defined manner). The movable part can in particular be a door, a cover, a flap, a hatch or the like. The other part can in particular be a frame.

(Door) hinges and kinematics assemblies are known for realizing a defined (door) movement path.

The object of the present invention is to create an improved hinge or an improved kinematics assembly. In particular, the improvement can relate to one or more of the following aspects: improved protection against external influences, improved protection against dirt, increased resistance, increased stability, improved burglary protection, improved protection against injuries, improved/increased opening angle, improved motion path, improved temperature resistance, increased life expectancy, improved resistance to solar radiation and/or chemical influences.

The object is attained by the subject matters of the independent claims. Advantageous configurations of the invention are the subject matter of the corresponding dependent claims and result from the present description.

A hinge can be created which can combine an improved opening angle, improved load-bearing capacity, improved lift-out and/or insensitivity to external influences, in particular for any application and branch, wherein a hinge that is completely industry-compliant in terms of industrial quality standards and requirements can be created.

One aspect pursued with the invention is to enable a small installation space or a small installation depth of the hinge with a large lift-out. A previously not considered possible lift-out in relation to the installation depth is possible. A ratio of lift-out to installation depth can be achieved which can be greater than 0.6, in particular greater than 0.7.

An aspect pursued with the invention, which alone can justify the invention, is, among other things, an improvement or increase in stability and/or improvement against external influences and/or dirt, which can be achieved by a solid construction and/or an interlocking or engagement of levers provided with the hinge. A hinge for connecting one movable part to another part can be provided which has four levers and each lever has a linkage hole at one lever arm end for linking with the movable part or the other part so that the hinge forms four points of rotation in the region of the linkage. Two of the levers engage in one another in a region between the two lever arm ends and in the region of the engagement an attachment extending transversely to the engagement is formed between the levers.

A further aspect pursued by the invention, which alone can justify the invention, concerns, among other things, an improvement or increase in stability and/or improvement against external influences and/or dirt, which can be achieved by a finger-like interlocking of two levers. A hinge for connecting one movable part to another part can be provided wherein the hinge has four levers and each lever has a linkage hole at one lever arm end for linking with the movable part or the other part so that the hinge forms four points of rotation in the region of the linkage. Two of the levers between the two ends of the lever arm engage in one another like fingers and in the region of the engagement there is a bore which extends transversely to the engagement and through which a pin-like element extends, by means of which the two levers are fastened to one another.

A further aspect pursued with the invention, which alone can justify the invention, concerns, among other things, the improvement or increase in stability and/or improvement with respect to external influences and/or dirt, which can be achieved by a closed or compact design. A hinge for connecting one movable part to another part can be provided which has four levers, wherein the levers are interlocked such that recesses and apertures in three of the four levers are substantially closed by one of the other levers.

A further aspect pursued by the invention, which alone can justify the invention, concerns, among other things, an improvement or increase in stability and/or improvement with respect to external influences and/or dirt, which can be achieved by a massive construction along the height of the levers along the rotation axes. A hinge for connecting one movable part to another part can be provided which has four levers and each lever has a linkage hole at one lever arm end for linkage with the movable part or the other part so that the hinge has four axes of rotation in the region of the linkage, wherein three further axes of rotation are formed between the levers and the levers extend in a direction along the axes of rotation and engage in several planes, the top plane covering the other planes.

Each of the above aspects can be combined with one or more of the other aspects. The combination is free of constraints. A combination of two or more of the aspects can lead to a further improvement of the hinge.

With a hinge of the present invention, it is possible to integrate the hinge completely in a moving part, in particular a door, and/or another part (fixed part), so that in the closed state of the moving part or the door the hinge is not visible from inside or outside. The hinge can improve the visual appearance. Due to a possible complete integration in a moving part, the protection against burglary can be increased. A risk of injury by a person operating the moving part can be minimized. Protection of the hinge against dirt or influences can be improved, which means that high functionality can be consistently provided; for example, dirt and ice cannot block movement. The hinge can be subjected to high loads, for example the hinge can be used in the construction machinery industry, where it can be particularly exposed to high vibrations. The hinge can be constructed without any laterally protruding components. The hinge can be designed in such a way that it does not protrude into a free space, in particular the minimum free space for a driver in a construction machine cabin.

When closed, the hinge mechanism can be protected from external influences. An opening angle of greater than or equal to 180° can be achieved. In the open state, the influence of contamination can be reduced. A minimum continuous load capacity of 70 kg, with peaks up to 210 kg, can be achieved. A life expectancy of 12,000 movement cycles can be achieved. Temperature resistance in the range from −40° C. to 55° C. can be achieved. Operation is possible in an environment with a humidity of 0 to 100%. Resistance to solar radiation according to ISO 4892-2 level 2 and chemical influences such as fuels, (hydraulic) oils, mineral fertilizers and salt can be achieved. According to ISO 9227, a salt spray test with a red rust time of at least 480 hours can be achieved. It may be possible to create a concealed hinge with 7 fixed points of rotation. The hinge can be scalable and can be used in a large number of installation situations and branches or industries, in particular the medical and/or food industry. The hinge can be designed to be maintenance-free or with long maintenance intervals, namely with low maintenance costs. The hinge can have a material such that the hinge can optionally be welded on. A compact design of the hinge is possible.

A lever within the meaning of the description is a component which has two ends (lever arm ends) through which an axis of rotation with a point of rotation can extend, in particular transversely to the longitudinal extent of the lever. In two of the levers described in the description, in addition to the two axes of rotation at the ends of the lever arms, there is an additional axis of rotation, which in particular can also extend transversely to the longitudinal extent of the lever. The four levers are interlocked in such a way that a hinge having 7 points of rotation can be formed.

An attachment can be made on the movable part and on the other part in such a way that two of the points of rotation are fixed on the movable part and two of the points of rotation are fixed on the other part. In each case, the fixing can occur by means of an attachment that holds the two points of rotation in a fixed relative relationship to one another. A mirror axis can run through one of the points of rotation, which mirror axis can be selected in such a way that the remaining six points of rotation are arranged mirror-symmetrically to the mirror axis. The other two points of rotation, which differ from the point of rotation through which the mirror axis runs and from the four points of rotation, which are fixed by means of the two attachments, are each connected to a point of rotation of an attachment, wherein one of the levers also has the point of rotation through which the mirror axis extends.

The points of rotation in the sense of the description have a pin-shaped element and a receptacle in at least one lever, through which the pin-shaped element extends. Four of the points of rotation that can be realized by means of the attachments can have a receptacle for a lever and a pin.

In terms of the description, a receptacle for a lever comprises a recess in the lever that is adapted to the pin-shaped element, for example in the form of a bore or the like. The inner diameter of the receptacle can be adapted to the outer diameter of the pin-shaped element, so that the latter can be arranged in the receptacle without any significant play. The receptacle can have a plurality of recesses, in particular aligned recesses, which extend along the axis of rotation. In particular, the receptacle can be formed at the end of a lever.

The receptacle can also be such that a bushing-shaped element is provided in a recess of the lever in order to receive the pin-shaped element. When a bushing-shaped element is present in the lever, the pin-shaped element can be adapted to the inside diameter of the bushing-shaped element. It can be provided that the bushing-shaped element does not extend completely through the recess in the lever, but the pin-shaped element is only present over a portion smaller than the length of the recess in the direction of extension of the pin-shaped element. A bushing-shaped element offers the advantage that better guidance can be provided since, among other things, the sliding properties can be improved. Furthermore, a bushing-shaped element can serve to divert axial forces, which can lead to an increase in the possible load and/or service life.

A pin-shaped element, for the purposes of the description, includes a rivet, bolt, pin or the like.

Four of the points of rotation have a pin-shaped element and a receptacle for a lever, wherein it is possible for the receptacle to be arranged on the end of the lever. Two levers can be connected to one another at two points of rotation by means of receptacles arranged at the ends and a pin-shaped element. At a point of rotation through which the mirror axis can run, two levers can be interlocked with one another, in that the levers also have a point of rotation between the points of rotation at the ends in addition to points of rotation arranged at the ends.

With the hinge or the kinematics assembly, a motion sequence can be implemented that has or consists of two motion phases. The motion phases are two rotational movements. First, a small rotational movement to realize, for example, a distance between the frame and the door (a "lifting out" of the door). Thereafter, a large rotational movement can take place, which is the "rotation" of the door to achieve the desired final position and the required distance. The type of movement and the associated end position of the door/distance of the door can be varied by means of the position of the points of rotation and the installation arrangement/position of the hinge. If the position of the points of rotation and the installation position are changed, it is possible to create a wide variety of end positions and movement sequences for a wide variety of applications.

It can be provided that when the hinge is closed, there is an enclosed angle is present, which is less than 155°, between a connecting line between the point of rotation with the mirror axis and a point of rotation outside the attachments and a connecting line between the point of rotation with the mirror axis and the point of rotation at the attachment for a lever. In particular, the angle can be less than 150°, preferably less than 145°, preferably less than 143°, preferably less than 141° or preferably less than 139°. Preferably, the enclosed angle can be 138°.

Provision can be made for an angle enclosed, in the closed state, between a connecting line between the two points of rotation of an attachment and a connecting line of the point of rotation adjacent to the attachment and the point of rotation of the attachment adjacent to the point of rotation being less than 20°, in particular the angle can be less than 18°, in particular less than 17°, in particular less than 16°, in particular the angle can be less than 15°, in particular the angle can be less than 14°, in particular can the angle can be less than 13°, in particular the angle can be less than 12°, in particular the angle can be less than 11°, in particular the angle can be less than 10°, in particular the angle can be less than 9°, in particular less than 8°, in particular the angle can be less than 7°.

In a preferred embodiment, in the closed state, the ratio between the length of a connecting line between the point of rotation with the mirror axis and a point of rotation outside the attachments and the length of a connecting line between the point of rotation with the mirror axis and the point of rotation at the attachment for a lever can be in a range between 0.8 and 1.2. The aforementioned ratio is preferably in the range from 0.85 to 1.15, more preferably in the range from 0.9 to 1.1.

In the sense of the description, the term "connecting line" comprises a straight line, namely the shortest possible connection of two points in space. In particular, a connecting line can be observed in a plane transverse to the points of rotation.

A possible symmetry of the points of rotation of the hinge may be permanent. That is to say, in the closed as well as in the open state, as well as in all states provided in between, a symmetry with respect to a mirror axis running through the point of rotation can be provided. Due to the movement of the hinge in space, the mirror axis can be adapted to the respective opening angle of the hinge.

In a preferred embodiment, the opening angle of the hinge is greater than 90°, preferably greater than 100°, preferably greater than 110°, preferably greater than 120°, preferably greater than 130°, preferably greater than 140°, preferably greater than 150°, preferably greater than 160° or preferably greater than 170°. In a particularly preferred embodiment, the opening angle of the hinge is 180°.

In a preferred embodiment, the attachments remain in one plane when moving from the closed state to the open state, namely the attachments do not leave the plane.

In the closed state, the attachments can be arranged opposite one another. For example, the attachments can have attachment surfaces, which can be arranged essentially parallel to one another in the closed state.

When open, the attachments can be aligned with one another in one direction. In particular, attachment surfaces of the attachments can extend in one plane. For the purpose of the description, an attachment surface of an attachment is the surface through which the fastening means, in particular screws, which can connect the attachment to the fixed part and/or the movable part, extend.

In the sense of the description, the term "parallel" comprises not only the meaning that is explicitly reproduced by the basic sense of the word, but also deviations from the purely geometric parallelism, which can occur in particular due to tolerances. The term "parallel" therefore includes, for the purposes of the description, deviations of +/−20°, in particular +/−15°, in particular +/−10°, in particular +/−5°, in particular +/−3°, in particular +/−2°. "Parallel" in the sense of the description can therefore also be understood in such a way that the two referenced directions, lines, planes and/or surfaces include an acute angle of +/−20°, +/−15°, +/−10°, +/−5°, in particular +/−3°, in particular +/−2°.

The term "transverse" within the meaning of the description comprises the geometric definition that the two directions, lines, surfaces and/or planes referred to do not run parallel to one another. In particular, it may be provided that the term "transverse" describes two directions, lines, planes or surfaces, enclosing relative one another an angle greater than 20°, in particular greater than 30°, in particular greater than 40°, in particular greater than 50°, in particular greater than 60°, in particular greater than 70°, in particular greater than 80°. The term "transverse" also includes the configuration in which the directions, lines, planes or surfaces enclose an angle of 90°.

For the purpose of the description, the explicitly mentioned numerical data not only comprise the exact value but also deviations from this value, which can occur, for example, due to production tolerances and which may lie in the range of +/−15%, in particular in the range of +/−10%, in particular in the range of +/−5%.

The above statements, like the following description of exemplary embodiments, do not represent an exclusion of certain embodiments or features.

In the following, the invention will be explained in greater detail with reference to an exemplary embodiment illustrated in drawings. In the drawings:

FIGS. 4A-4D show a third lever in different views;

Figure 1A:
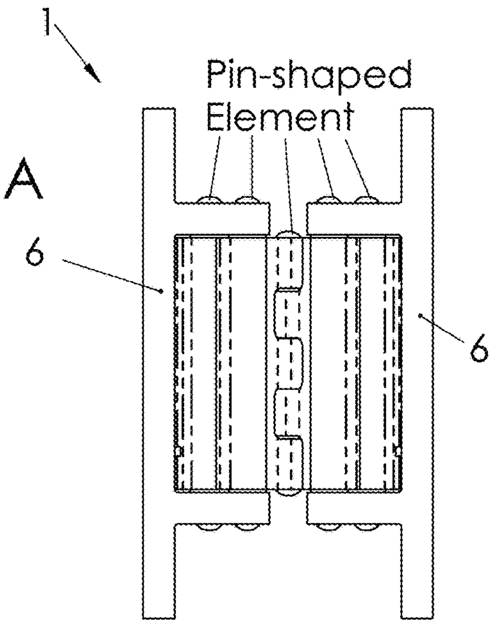
FIGS. 1A-1E show representations of the hinge in different views.
Figure 1D:
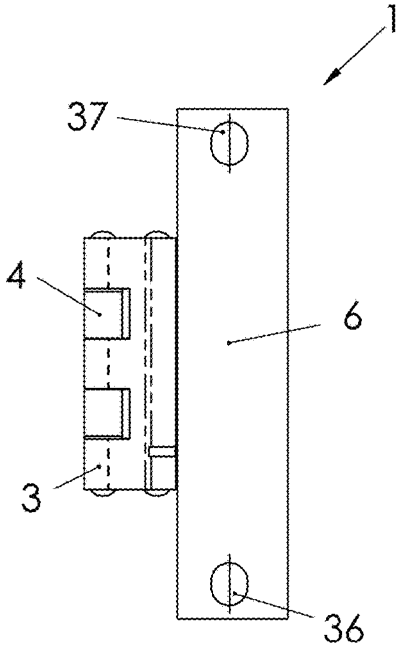
Figure 1B:
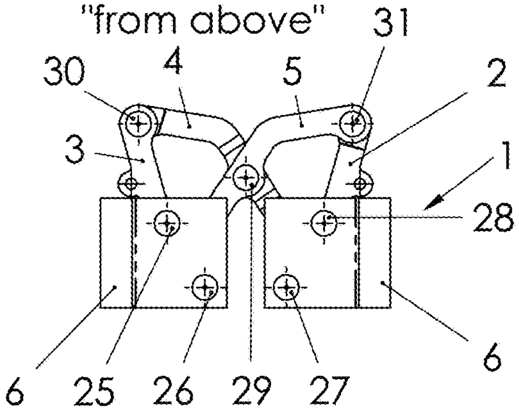
Figure 1C:
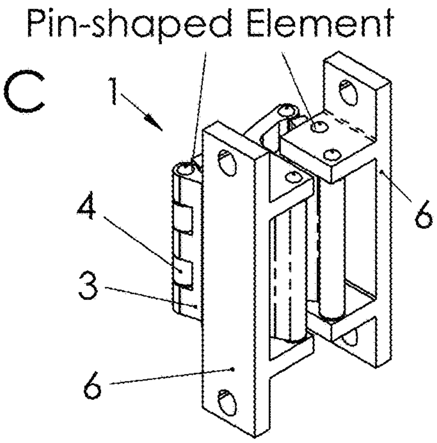
Figure 1E:
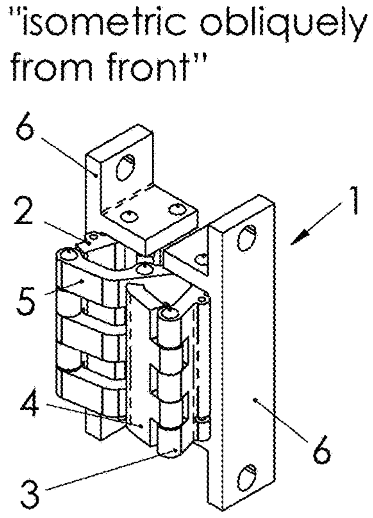
Figure 2A:
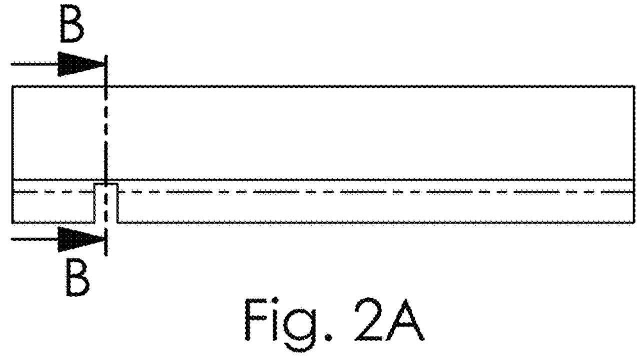
FIGS. 2A-2E show representations of a first lever in different views.
Figure 2B:
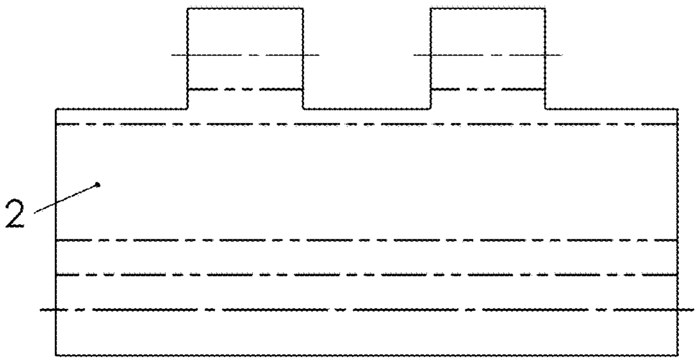
Figure 2D:
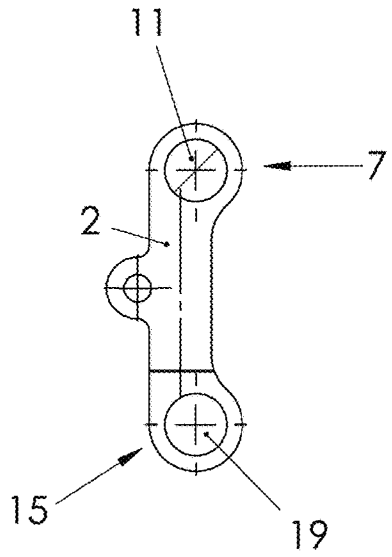
Figure 2C:
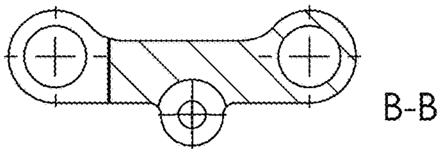
Figure 2E:
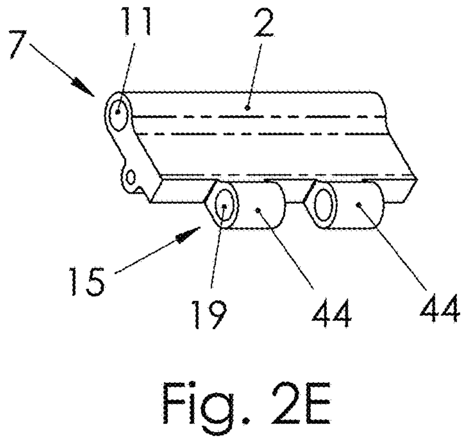
Figure 3A:
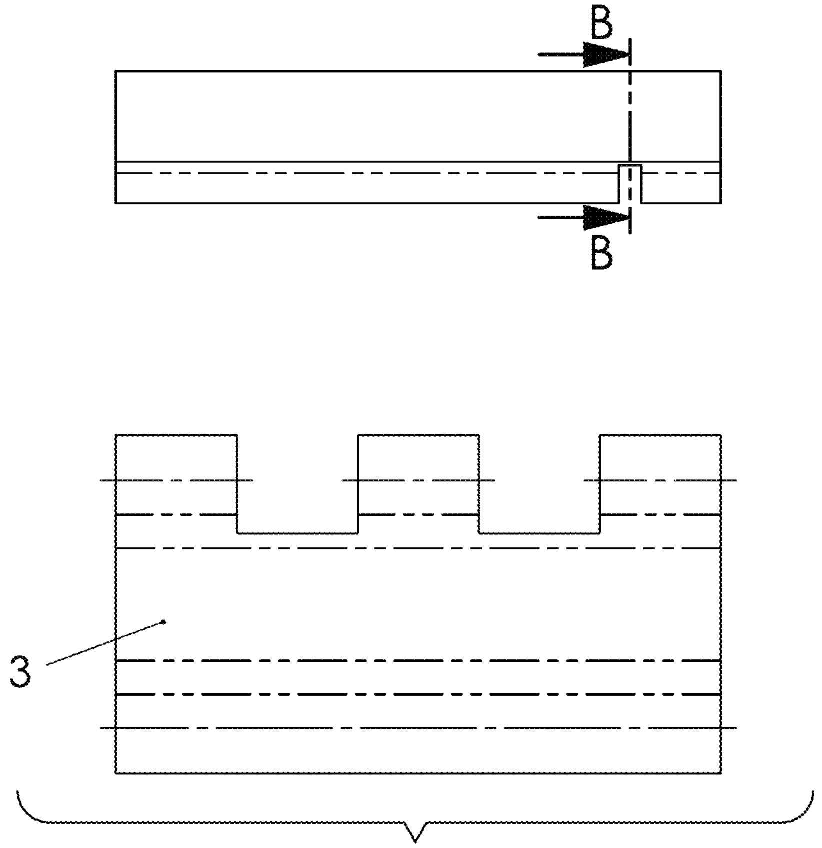
FIGS. 3A-3D show representations of a second lever in different views.
Figure 3B:
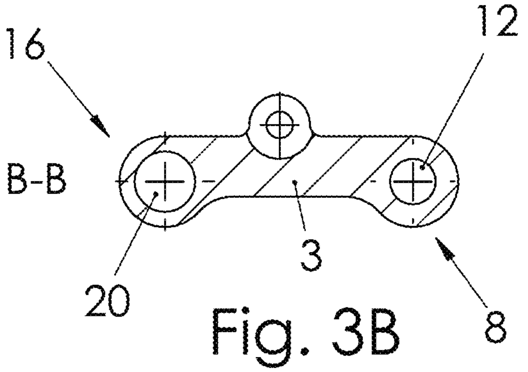
Figure 3D:
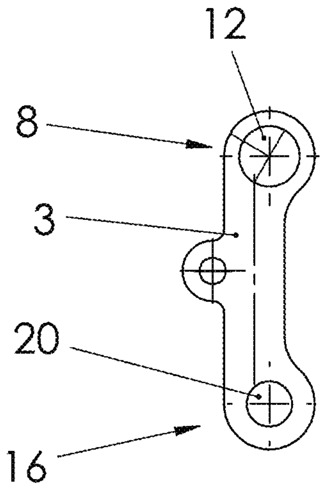
Figure 3C:
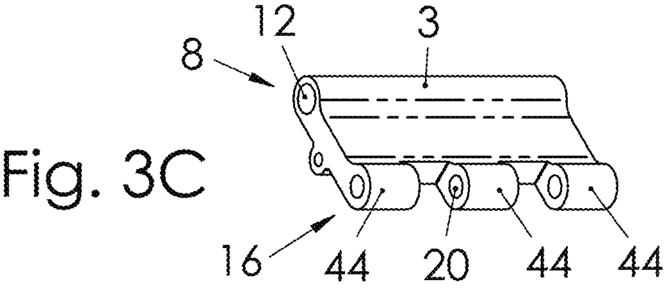
Figure 5A:
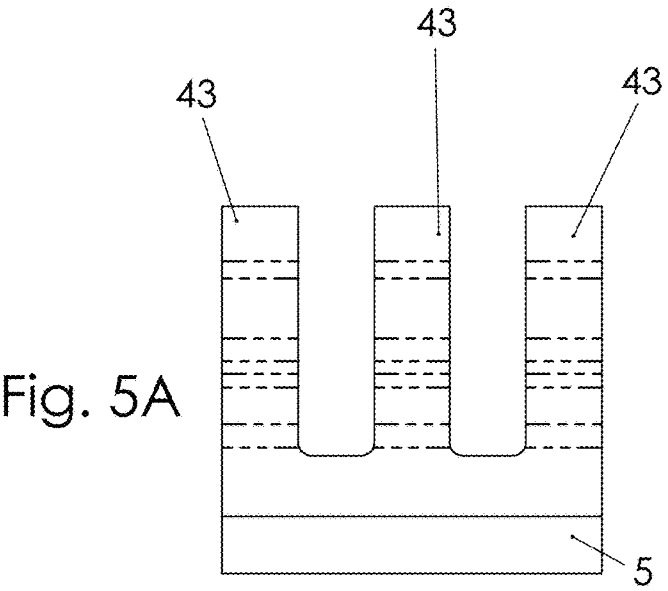
FIGS. 5A-5D show a fourth lever in different views.
Figure 5B:
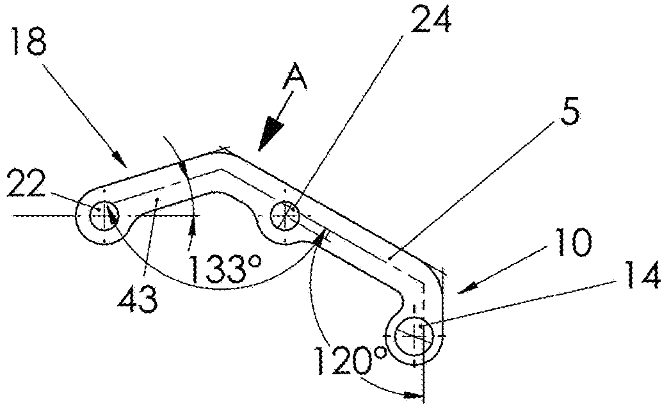
Figure 5C:
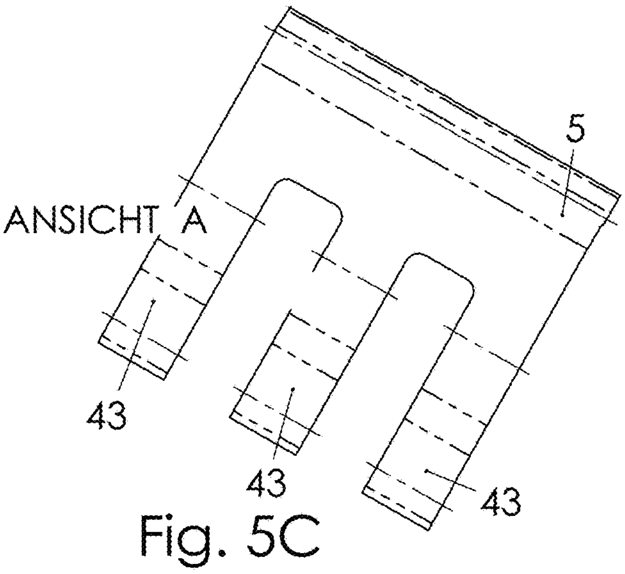
Figure 5D:
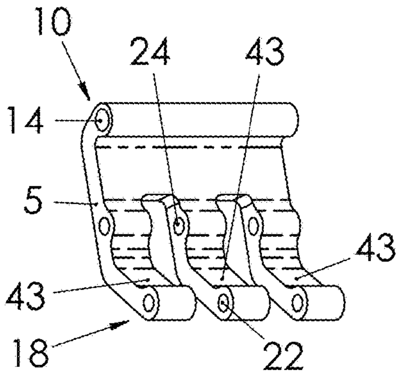
Figure 6A:
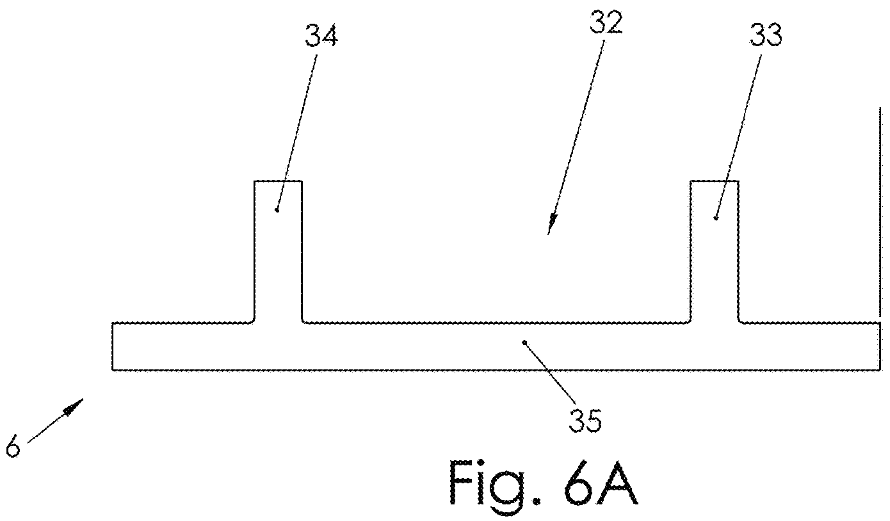
FIGS. 6A-6E show an attachment in different views.
Figure 6C:
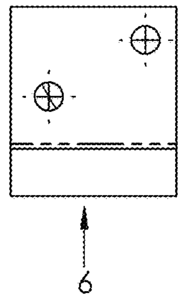
Figure 6B:
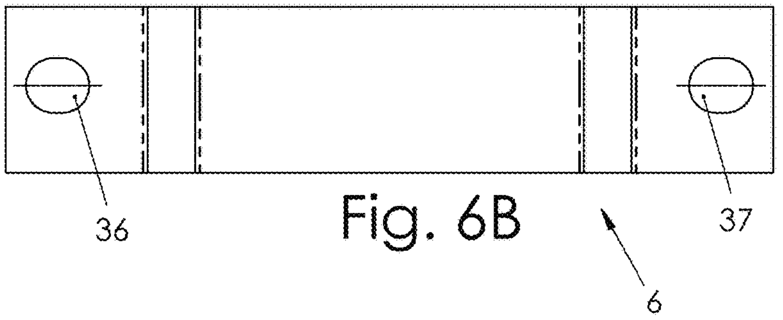
Figure 6D:
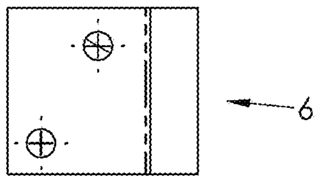
Figure 6E:
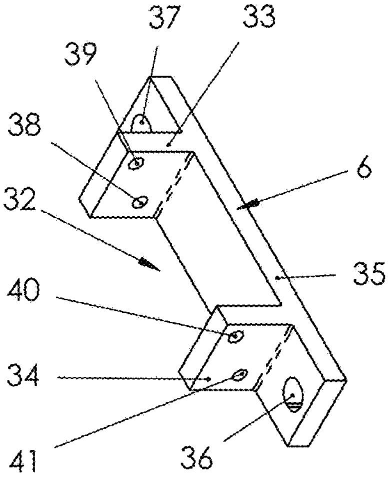
Figure 7:
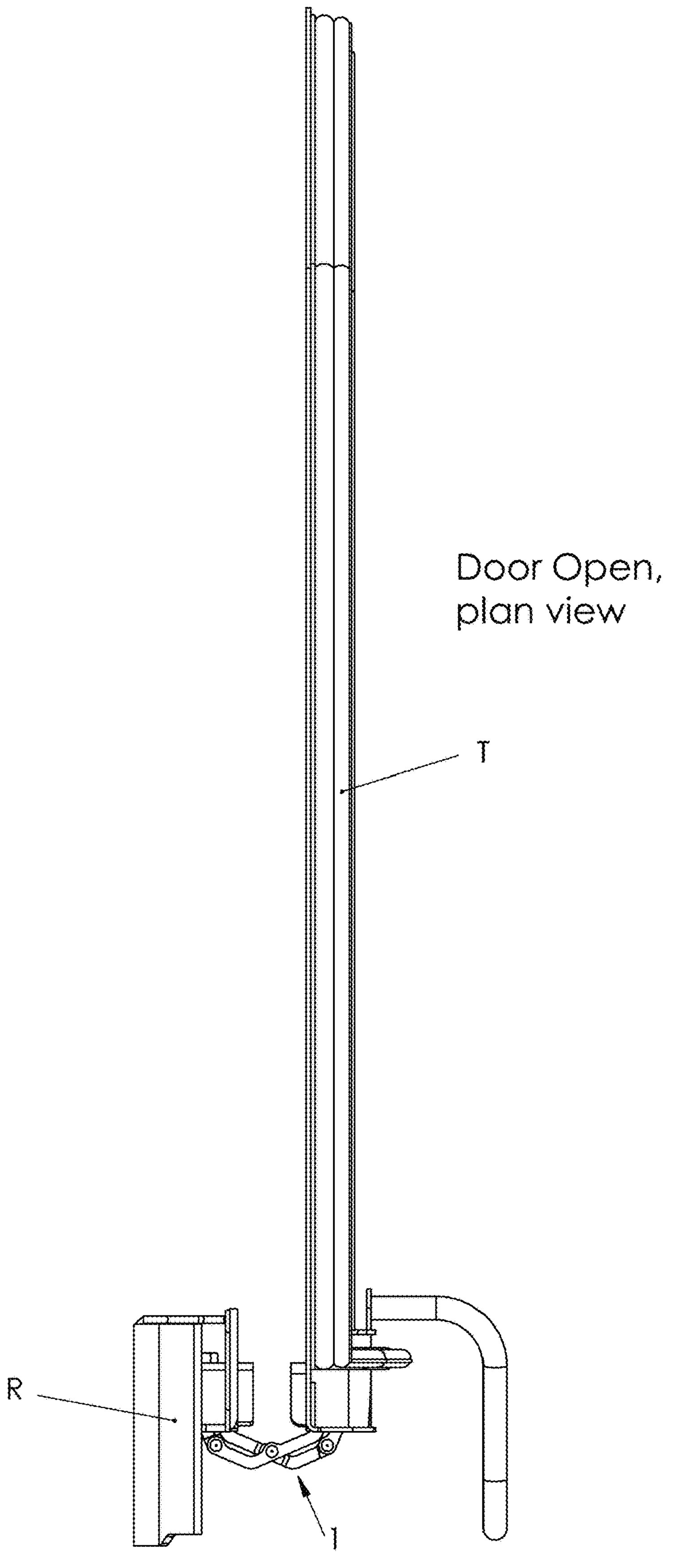
FIGS. 7 to 17 show an exemplary embodiment of a hinge with door and frame.
Figure 8:
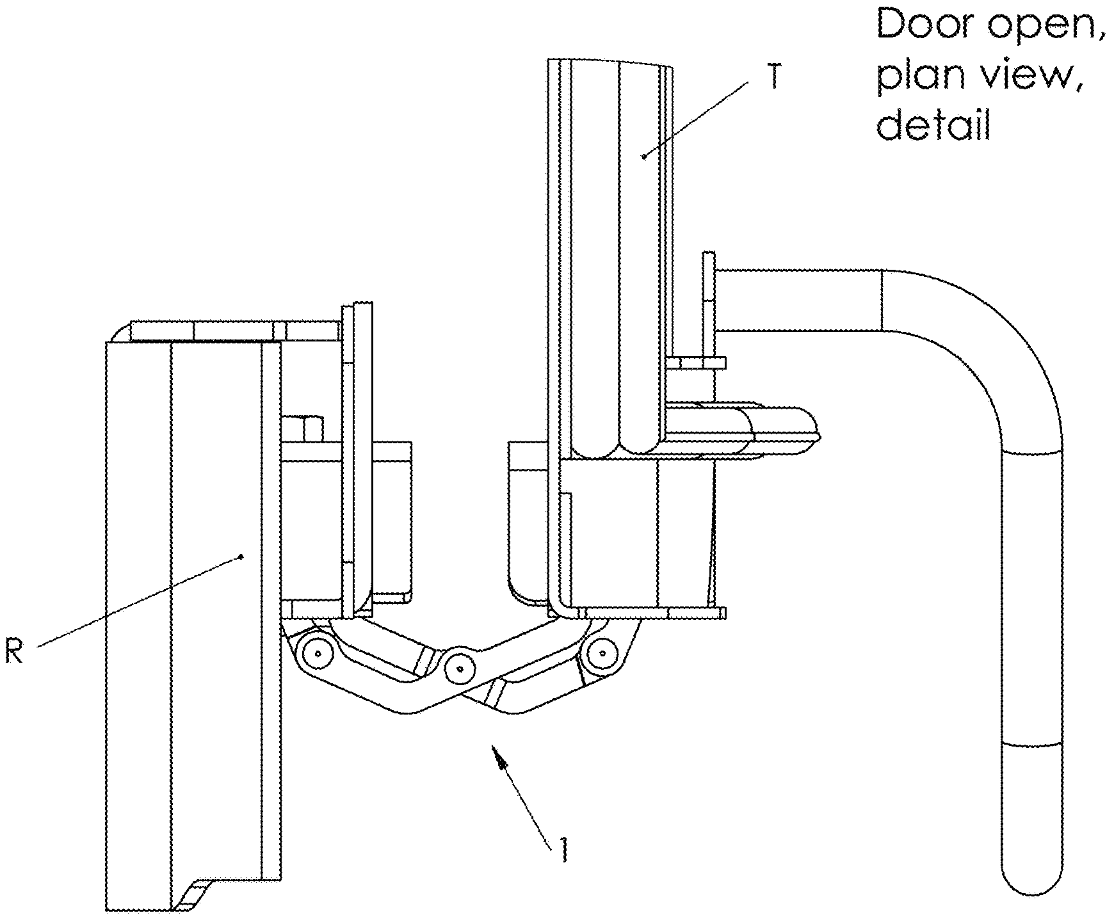
Figure 9:
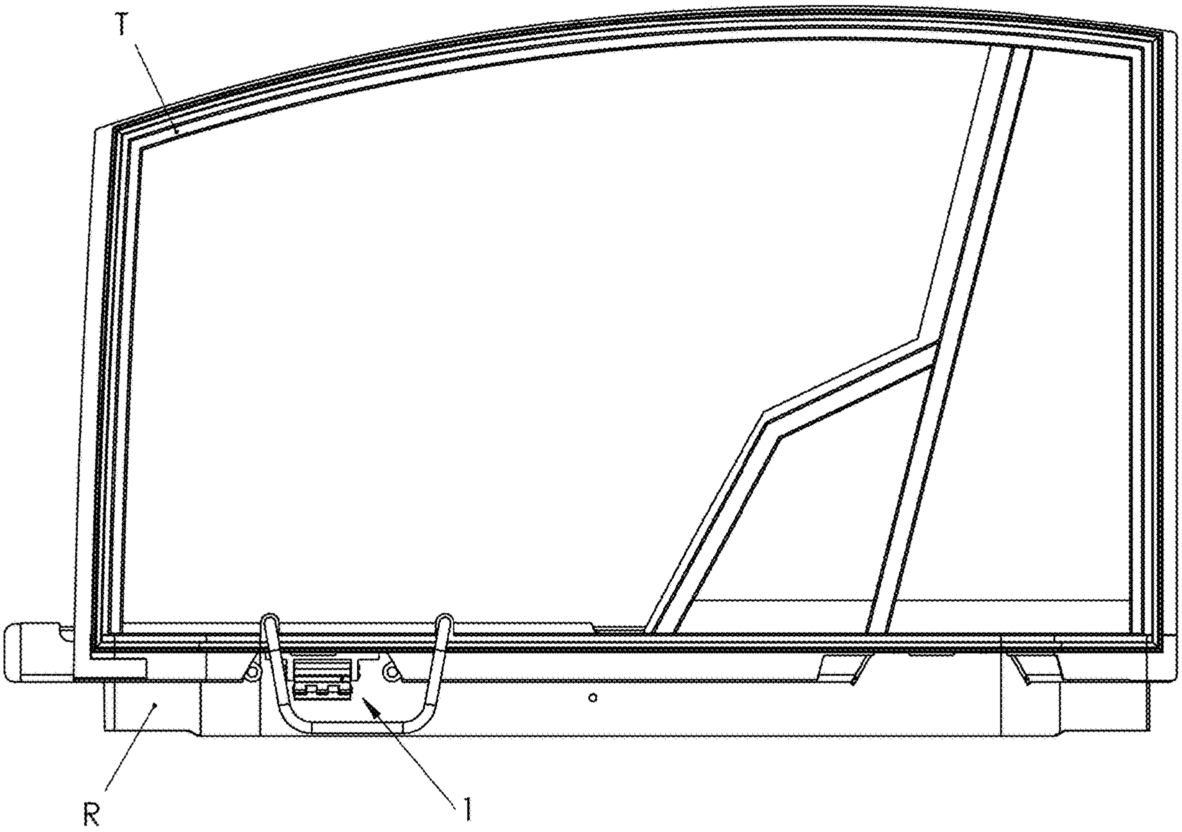
Figure 10:
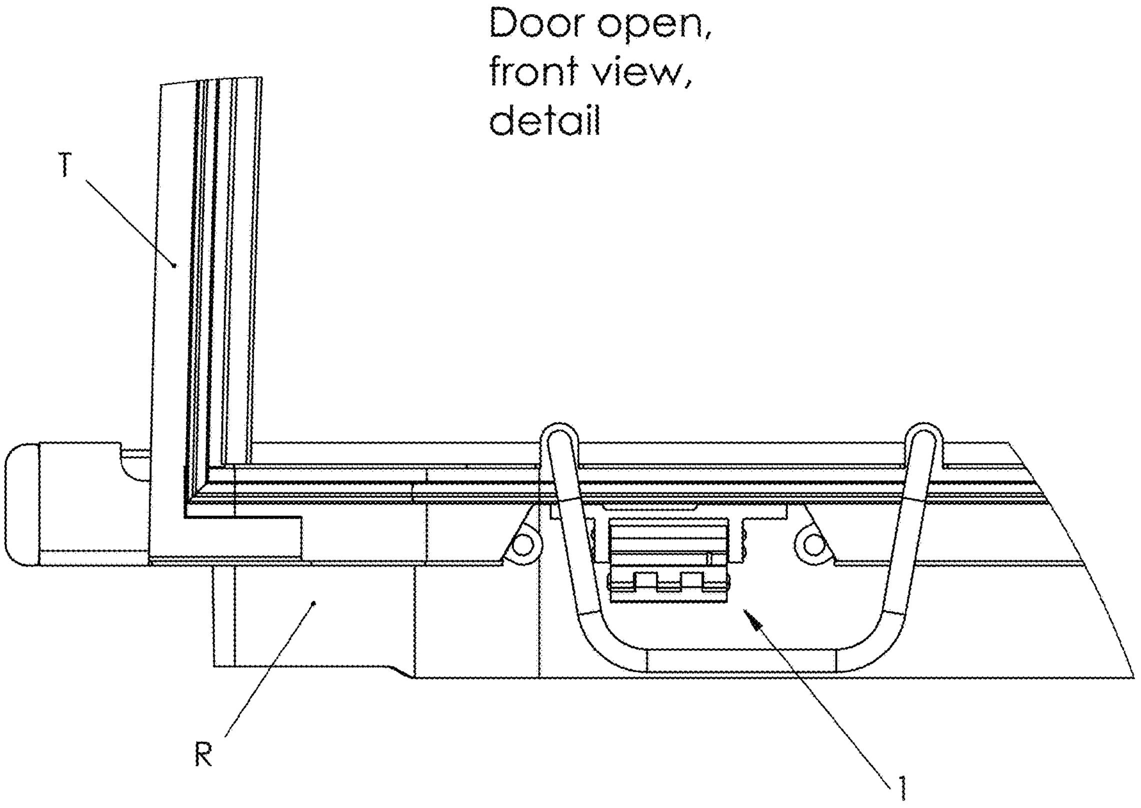
Figure 11:
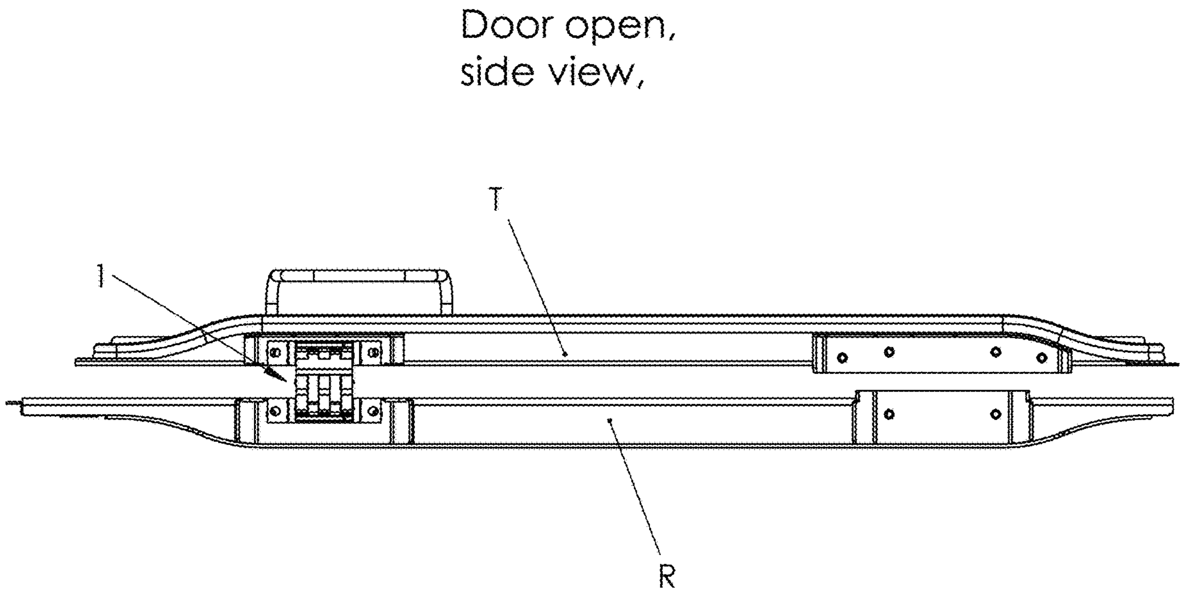
Figure 12:
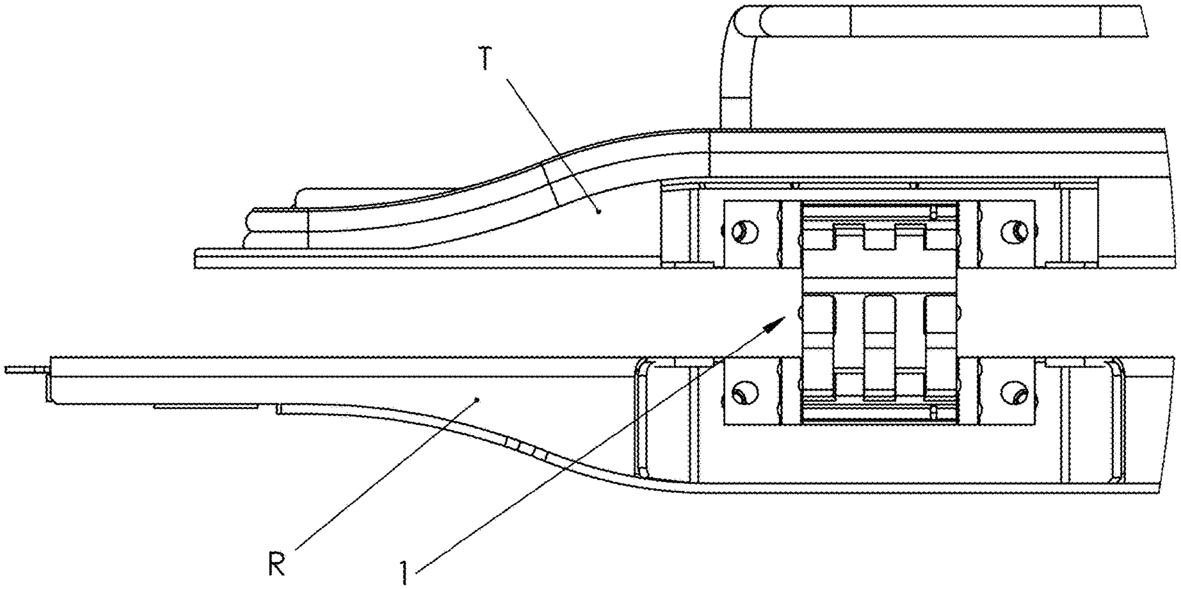
Figure 13:
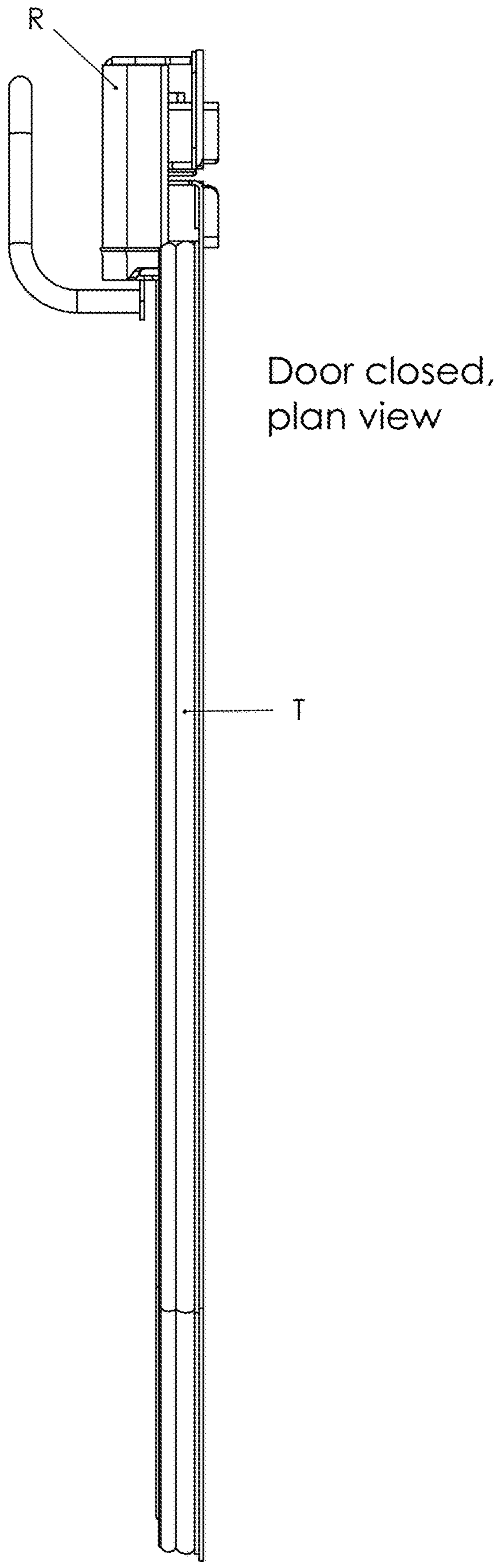
Figure 14:
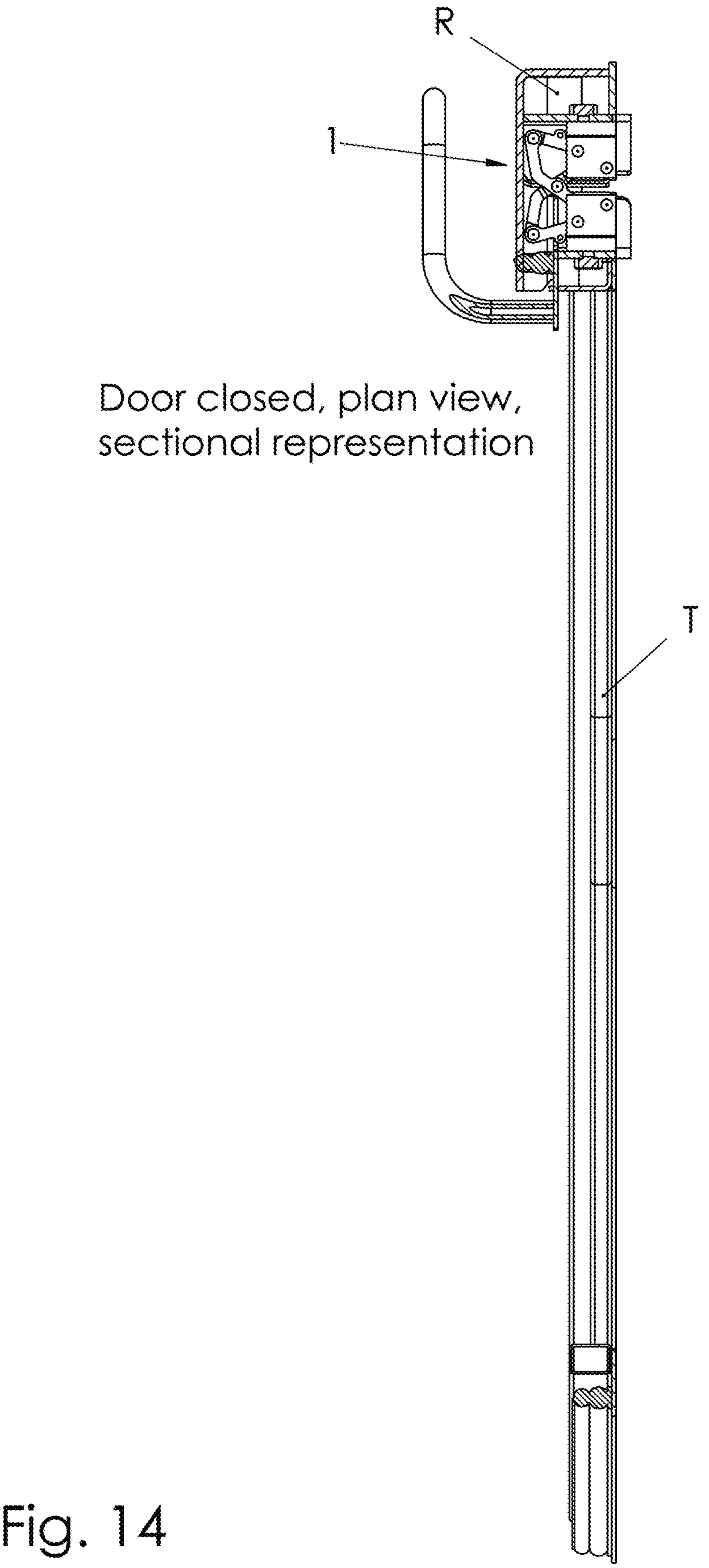
Figure 15:
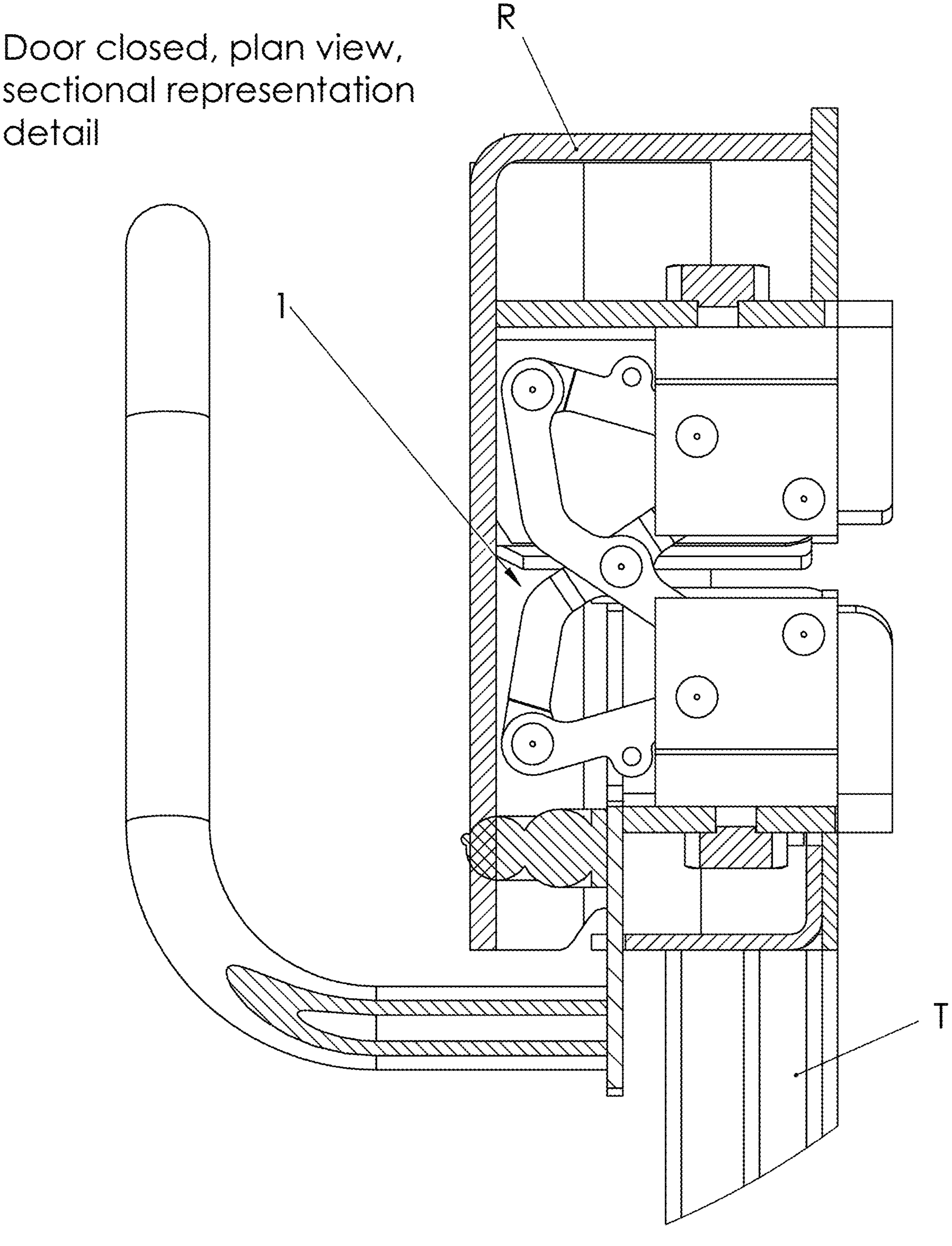
Figure 16:
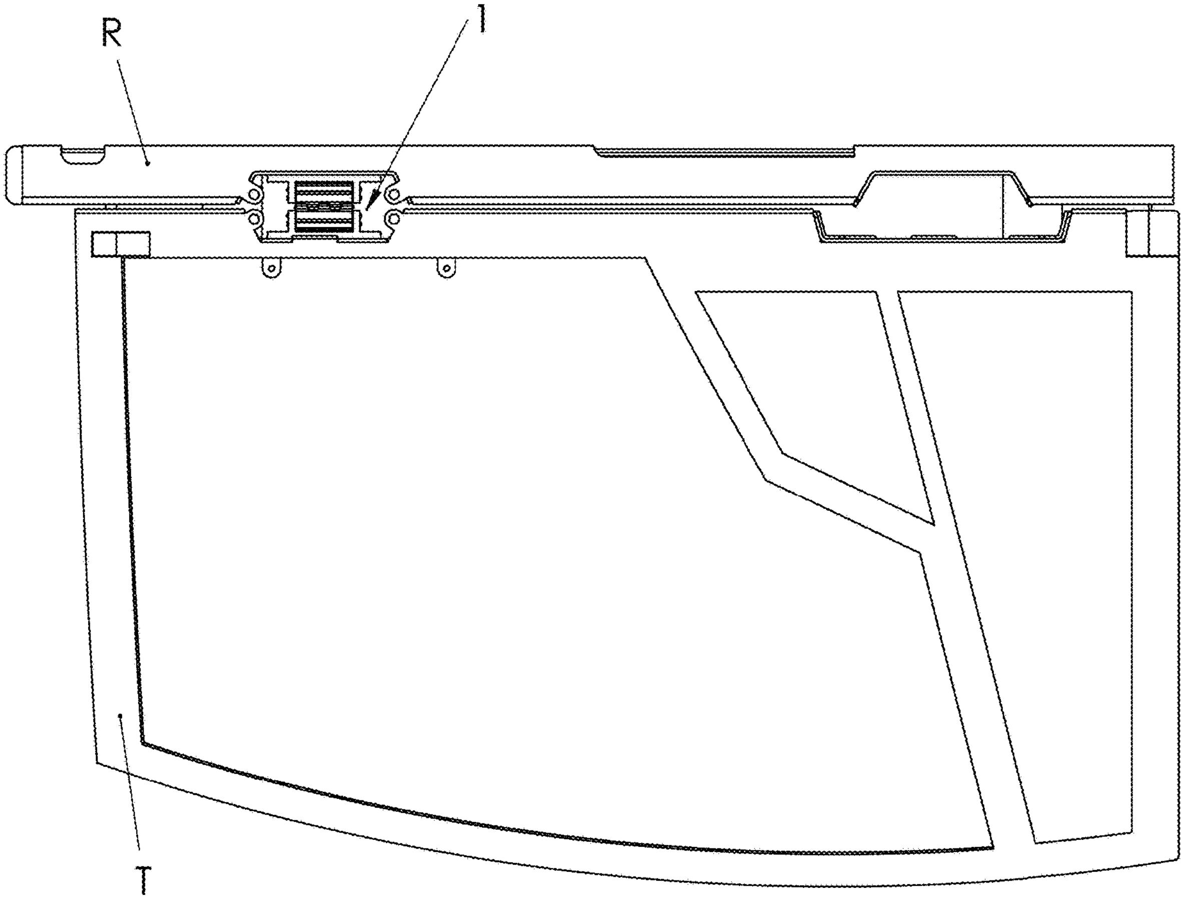
Figure 17:
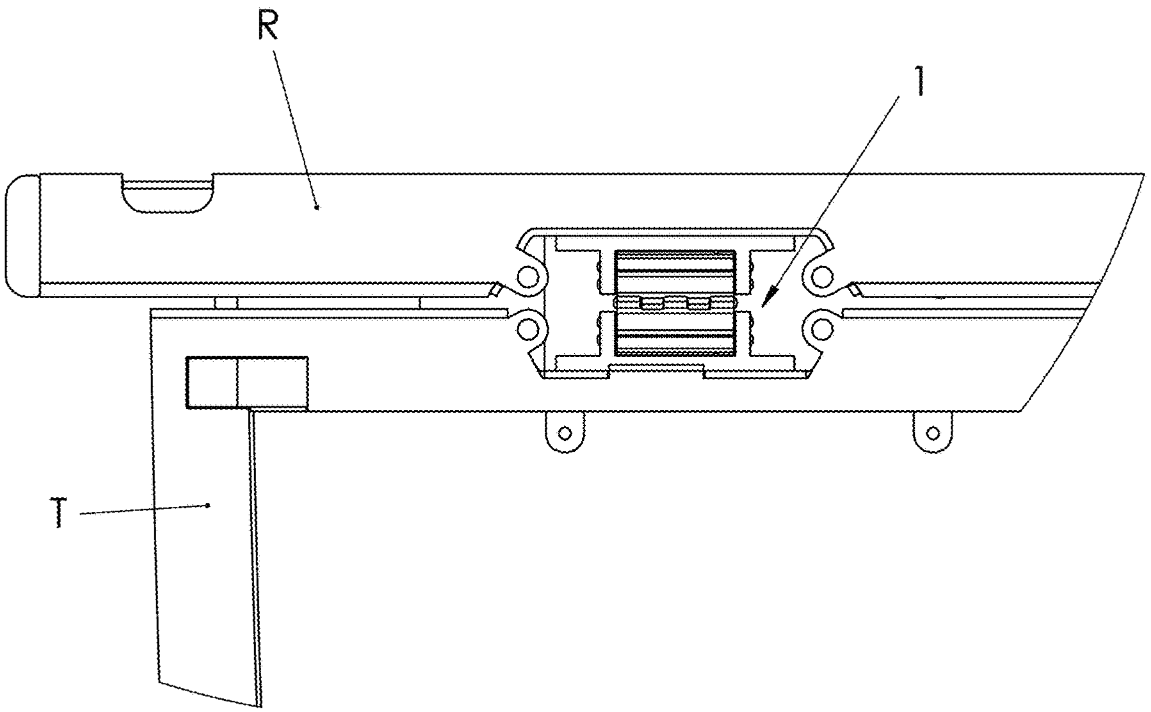

FIGS. 1A-1E show a hinge 1 in various views. The hinge 1 has four levers 2, 3, 4, 5. The "from above" view in FIGS. 1A-1E show that external influences from above can only affect an upper surface. In particular, bushings or bushing openings located below the top surface are covered. In this case, the covering can inherently be provided by the levers themselves.

The "isometric oblique view from the front" shows that the levers 2, 3, 4, 5 engage into one another. The levers 2, 3, 4, 5 are interlocked.

The hinge 1 has two attachments 6 in the illustrated embodiment.

The levers 2, 3, 4, 5 have a bore 11, 12, 13, 14 (bushing) at the respective lever arm ends 7, 8, 9, 10, into which a pin-like element, in particular in the form of a rivet pin or bolt, can be inserted, and with which the respective lever 2, 3, 4, 5 can be connected to the lever arm end 7, 8, 9, 10 with the attachment 6.

Two of the levers 2, 4 and 3, 5 are linked in pairs to an attachment 6. The first and the third lever 2, 4 are connected to the left attachment 6 in the isometric oblique view from the front of FIGS. 1A-1E. The second and fourth levers 3, 5 are connected to the attachment 6 on the right. To connect the levers 2, 3, 4, 5, the bores 11, 12, 13, 14 (bushings) are configured at the lever arm ends 7, 8, 9, 10 in such a way that they extend through the entire lever.

In the region of the respective other end of the lever arm 15, 16, 17, 18 there is a bore 19, 20, 21, 22 (bushing) in each case. The bore 19 on the lever arm end 15 of the first lever 2 is aligned such that the bore 22 on the lever arm end 18 of the fourth lever 5 is aligned and a pin-shaped element, in particular in the form of a rivet pin or bolt, is inserted into the bore.

The bore 20 on the lever arm end 16 of the second lever 3 is aligned with the bore 21 on the lever arm end 17 of the third lever 4 and a pin-shaped element is inserted into the bores 20, 21, in particular in the form of a rivet pin or a bolt, in order to connect the levers 3, 4 at the lever arm ends 16, 17. At the lever arm end 15 of the first lever 2 and the lever arm end 18 of the fourth lever 5, the lever arm ends 15, 18 engage one another. The fourth lever 5 surrounds with its finger-like lever arm end 18 the lever arm end 15 of the first lever 2 and also engages with one of the fingers (middle finger) between two projections of the lever arm end 15 of the first lever 2. The bore (bushing) in the finger-like lever arm end and the bore (bushing) in the projection-like lever arm end align with each other in the present engagement. Similarly, the lever arm end 16 of the second lever 3 and the lever arm end 17 of the third lever 4 are connected to each other, wherein the bore (bushing) in the lever arm end 16, 17 of the two levers extends through projections which engage and align with each other.

The third lever 4 and the fourth lever 5 are connected in a region between the lever arm ends. In this region between the lever arm ends, the fourth lever 5 is designed in the form of a finger (finger 43). The third lever 4 is designed in the region between the lever arm ends 9 and 17 with recesses or openings or windows (openings 42) through which the fingers 43 of the fourth lever 5 pass. The upper and the lower recess or aperture (openings 42) in the third lever 4 are open at the top and bottom. A central aperture or recess (opening 42) is designed like a window. In the region of the openings or fingers of the two lever arms 4, 5, a bore 23 (bushing) is formed in the third lever 4 and a bore 24 (bushing) is formed in the fourth lever 5. The bores 23 and 24 are aligned with one another and a pin-shaped element is inserted into the bores, in particular a rivet pin or a bolt, with which the levers 4, 5 are connected to one another.

The bores with the inserted pin-shaped elements form seven points of rotation 25, 26, 27, 28, 29, 30, 31, as can be seen from above in FIGS. 1A-1E. A respective axis of rotation intersects the point of rotation 25, 26, 27, 28, 29, 30, 31 and extends essentially perpendicularly into the plane of the drawing. Each of the bores of the levers 2, 3, 4, 5 forms part of a point of linkage or rotation.

The levers 2, 3 are essentially straight. The two levers 2, 3 are designed to be shorter than the levers 4, 5. In the case of the levers 4, 5, which have three bores, the lever arm ends 9, 17; 10, 18 are offset from a central region and the bores at the ends of the lever arms are arranged outside of a line or straight line with the bore formed between the ends of the lever arms. The three points of rotation of the levers 4, 5 enclose an angle with one another.

The long levers 4, 5 cross each other to form a point of rotation 29 or a corresponding axis of rotation. At each attachment 6, a short lever 2, 3 and a long lever 4, 5 are linked. The long lever 4, 5 is connected to the corresponding other long lever 4, 5, thus forming the point of rotation 29, and to the short lever 2, 3, which is present at the other attachment 6. When a door is opened, a forced guided movement occurs, in which the door in particular can be pivoted around the frame by 180°.

The height of the levers 2, 3, 4, 5 essentially corresponds to the height of a receptacle 32 of the attachment 6. The receptacle 32 is formed like a clamp, wherein two struts 33, 34 extend from a base plate 35 of the attachment 6. In the struts 33, 34 there are bores 38, 39, 40, 41 for inserting the pin-shaped element with which the lever arm ends 7, 8, 9, 10 can be connected to the respective attachment 6. The attachment 6 to a door or a frame can take place by means of fastening elements guided through bores 36, 37 in the base plate 35. Alternatively or additionally, the attachment 6 can be welded to the base plate 35, in particular to the side that is spaced apart from the struts 33, 34, to the door T or the frame R.

Welding of the hinge or the attachment 6 can be made possible by a suitable choice of materials, in particular of the attachment.

FIGS. 7 to 17 show a hinge 1 with a door T and a frame R in different states of the door T and in different views.

Figure 18:
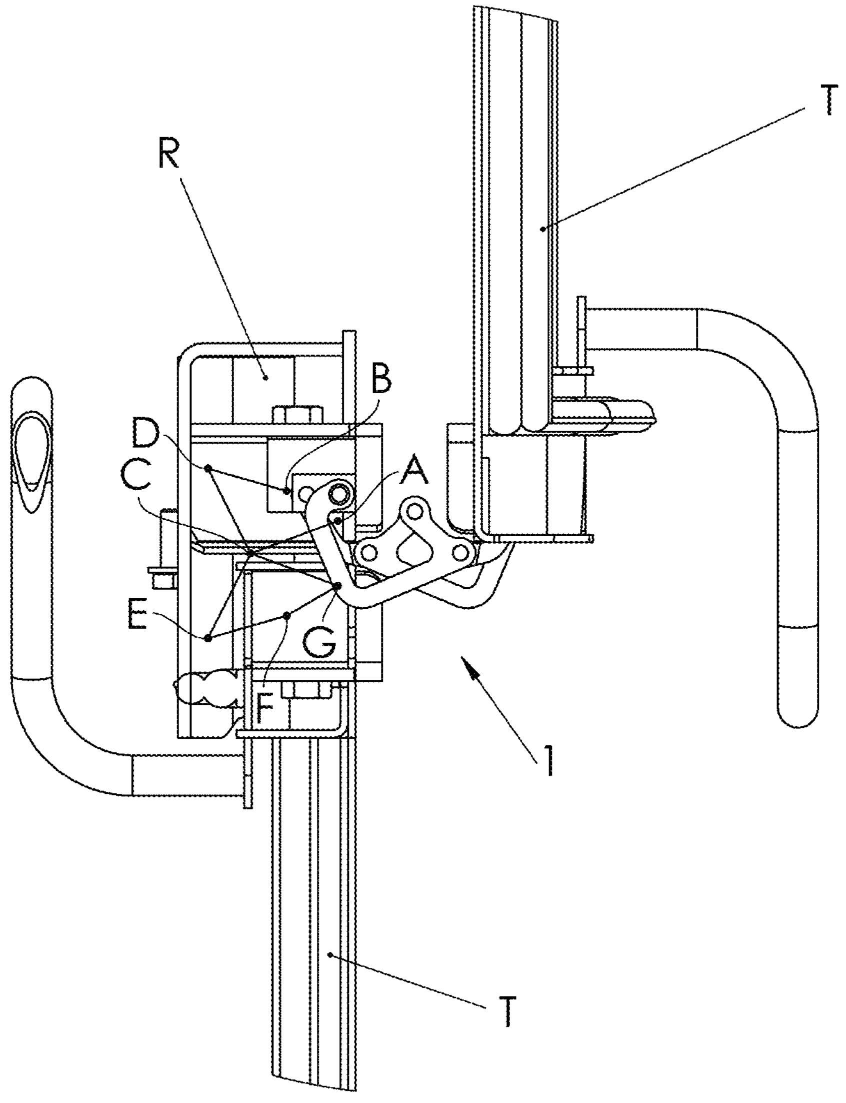
FIGS. 18 to 20 show movement curves.
Figure 19:
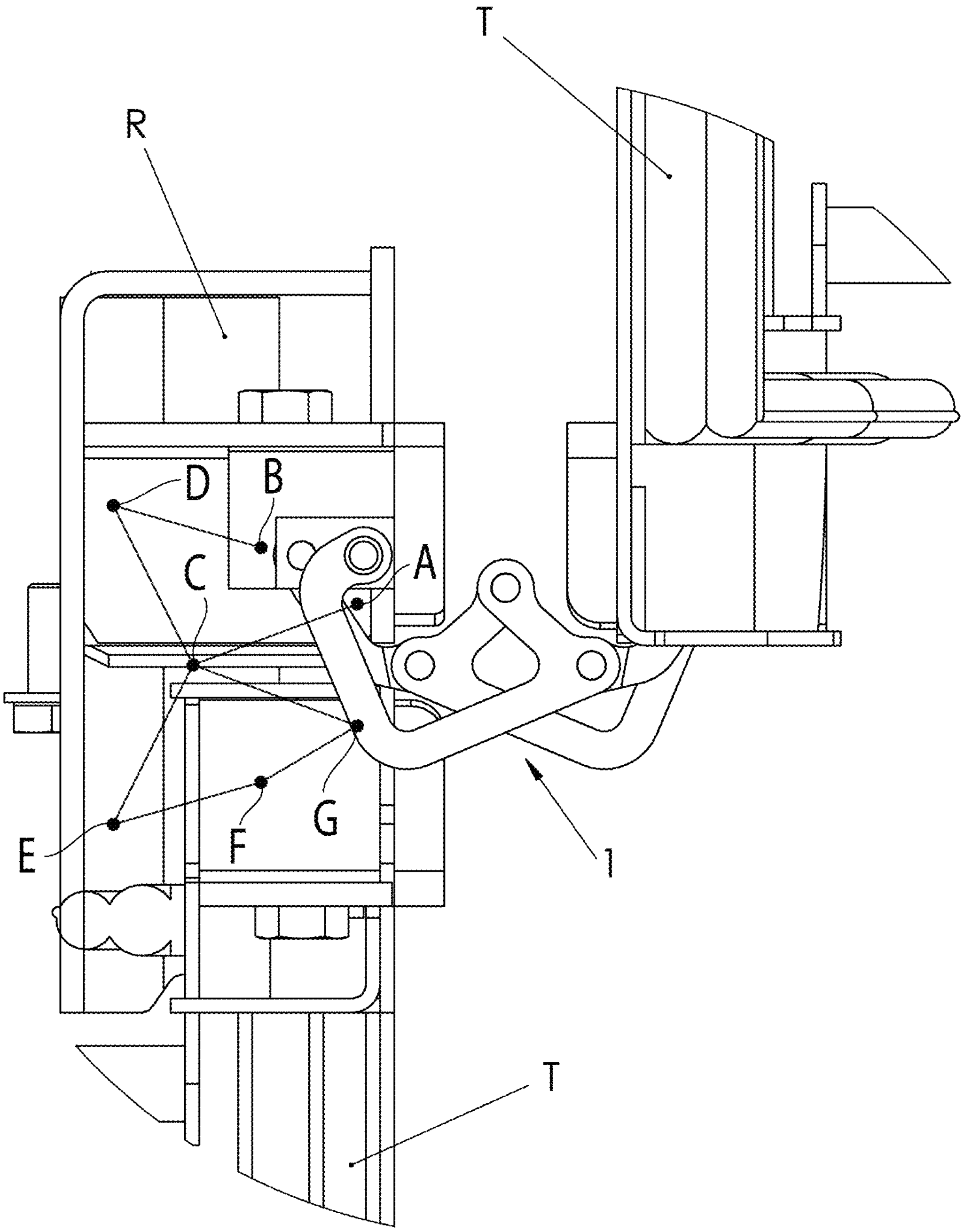
Figure 20:
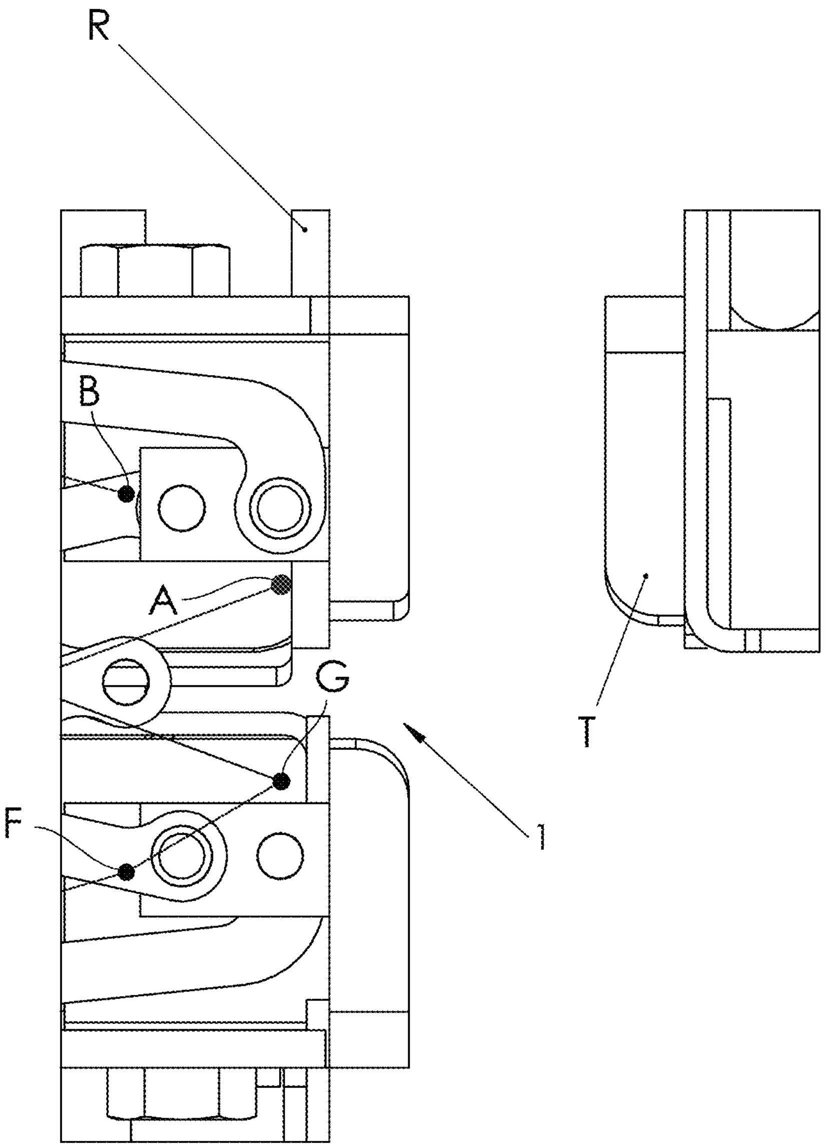

FIGS. 18 to 20 show movement curves of the door T relative to the frame R.

Figure 21:
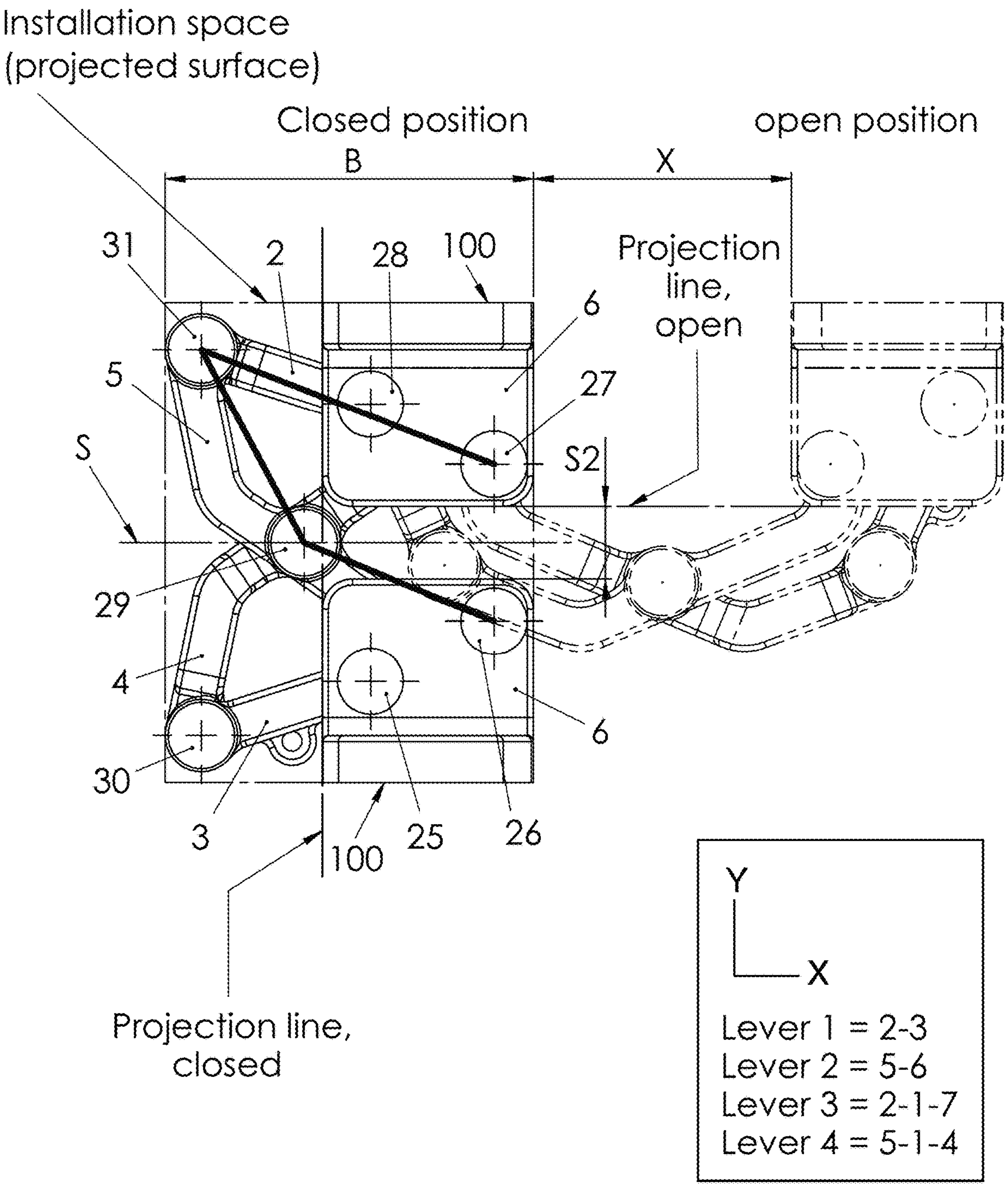
FIG. 21 shows a hinge in a plan view.

In FIG. 21, the hinge (1) is shown in a top view both in a closed position or condition and in an open position or condition. In addition to the levers 2, 3, 4, 5 with the points of rotation 25, 26, 27, 28, 29, 30, 31 and the attachments 6 and the attachment surfaces 100 provided on the attachments 6, FIG. 21 also shows the mirror-axis S of hinge 1, which runs through the point of rotation 29. Furthermore, the surface of the construction space can be seen in FIG. 21 as a projected surface with an installation depth B. In FIG. 21, the lift-out X resulting from the opening and the distance S2 between the attachments 6 are also indicated.

Furthermore, in FIG. 21, a connecting line between the point of rotation (29) with the mirror axis (S) and the point of rotation (31) outside the attachments (6) is drawn in for the closed state, as well as a connecting line between the point of rotation (29) with the mirror axis (S) and the point of rotation (26) on the attachment (6) for the lever (5). An angle of approximately 138° is enclosed between the connecting lines.

The invention describes, inter alia, the following embodiments:

1. A hinge (1) for connecting a movable part (T) to another part (R), wherein the hinge (1) has four levers (2, 3, 4, 5) and each lever (2, 3, 4, 5) has a bushing or linkage hole (11, 12, 13, 14) at one lever arm end (7, 8, 9, 10) for linkage with the movable part (T) or the other part (R), so that the hinge (1) forms four points of rotation (25, 26, 27, 28) in the region of the linkage, wherein two of the levers (4, 5) engage in one another in a region between the two lever arm ends of the levers (4, 5) and a connection transverse to the engagement is formed between the levers (4, 5) in the region of the engagement.
2. A hinge (1) for connecting a movable part (T) to another part (R), wherein the hinge (1) has four levers (2, 3, 4, 5) and each lever has a bushing or linkage hole (11, 12, 13, 14) at one lever arm end (7, 8, 9, 10) for linkage with the movable part (T) or the other part (R), so that the hinge (1) forms four points of rotation (25, 26, 27, 28) in the region of the linkage, wherein two of the levers (4, 5) engage finger-like in one another between the two lever arm ends (17, 18) and in the region of engagement a hole (23, 24) extending transverse to the engagement is formed, through which a pin-like element extends, by means of which the two levers (4, 5) are secured to each other.
3. A hinge (1) for connecting a movable part (T) to another part (R), in particular according to one of the embodiments 1 or 2, wherein the hinge (1) has four levers (2, 3, 4, 5) and the levers (2, 3, 4, 5) interlock in such a way that recesses or breakthroughs or openings (42) in three of the four levers (2, 3, 4, 5) through one of the other levers (2, 3, 4, 5) in are essentially closed.
4. A hinge (1) for connecting a mobile part (T) to another part (R), in particular according to one of the embodiments 1 to 3, the hinge (1) having four levers (2, 3, 4, 5) and each lever (2, 3, 4, 5) at one end of the lever arm (7, 8, 9, 10) has a linkage hole for the linkage with the movable part (T) or the other part (R), so that the hinge has four axes of rotation in the region of the linkage, wherein three further axes of rotation are formed between the levers (2, 3, 4, 5) and the levers (2, 3, 4, 5) extend in one direction along the axes of rotation and engage in one another in several planes, wherein the top plane covers the other planes.
5. A hinge (1) for connecting a movable part (T) to another part (R), in particular according to one of the embodiments 1 to 4, wherein the hinge (1) has four levers (2, 3, 4, 5), wherein two of the levers (2, 3, 4, 5) engage with one of the other levers (2, 3, 4, 5) at the respective lever arm ends (15, 16, 17, 18) with projections (44) formed at the lever arm ends (15, 16, 17, 18) and in the projections (44) an aligned bore is formed, into which a pin-shaped element is inserted to form an axis of rotation.
6. The hinge (1) according to any one of embodiments 1 to 5, wherein an attachment (6) is provided, by means of which two of the levers (2, 3, 4, 5) are connected, wherein the attachment (6) serves in particular for attachment to the moving part (T) or the other part (R).
7. The hinge (1) according to embodiment 6, wherein each of the attachments (6) has two pin-like elements which are guided through openings or bores/bushings arranged at the end on the levers (2, 3, 4, 5) and the attachment (6).

8. The hinge (1) according to embodiment 6 or 7, wherein the height of the lever (2, 3, 4, 5) essentially corresponds to the height of a receptacle (32) on the attachment (6).

9. The hinge (1) according to embodiment 8, wherein the receptacle (32) is formed by two struts (33, 34) on a base plate (35), in particular in the manner of a clamp.

10. The hinge (1) according to any one of embodiments 1 to 9, wherein three fingers (43) are provided on one lever (2, 3, 4, 5), which fingers protrude through three openings (42) of another lever (2, 3, 4, 5).

11. The hinge (1) according to embodiment 10, wherein two of the openings (42) are open at the edge and one of the openings (42) is closed at the edge.

12 The hinge (1) according to any one of embodiments 1 to 11, wherein two substantially straight levers (2, 3, 4, 5) and two substantially curved levers (2, 3, 4, 5) are provided, and the two curved levers (2, 3, 4, 5) are straight in portions in the region between the lever arm ends and engage with each other in this region and form an angle relative to the straight region between the lever arm ends in the region of the lever arm ends.

13. The hinge (1) according to any one of embodiments 1 to 12, wherein two of the four levers (2, 3, 4, 5) have lever arm ends which are offset from the middle region of the lever (2, 3, 4, 5).

14. Use of levers (2, 3, 4, 5) for a hinge (1) for connecting a movable part (T) to another part (R), wherein four levers (2, 3, 4, 5) are used and each lever (2, 3, 4, 5) has a linkage hole (11, 12, 13, 14) at one lever arm end for linkage with the movable part (T) or the other part (R) of the frame, so that the hinge (1) forms four points of rotation (25, 26, 27, 28) in the region of the linkage, wherein two of the levers (4, 5) are used, which engage in one another in a region between the two lever arm ends (17, 18) of the levers (4, 5) and in the region of the engagement a connection transverse to the engagement is formed between the levers (4, 5).

15. A door (T) with a hinge (1) and a frame (R), wherein the hinge (1) is designed in particular according to any one of claims 1 to 13, wherein the hinge (1) is integrated at the end in the door (T) and/or in the frame (R).

The invention claimed is:

1. A hinge (1) for connecting a movable part (T) to another part (R), wherein the hinge (1) has four levers (2, 3, 4, 5) with seven points of rotation (25, 26, 27, 28, 29, 30, 31), six (25, 26, 27, 28, 30, 31) of the seven points of rotation (25, 26, 27, 28, 29, 30, 31) are arranged axially symmetrically in relation to a mirror axis (S), which runs through a remaining one (29) of the seven points of rotation (25, 26, 27, 28, 29, 30, 31), and a first two (25, 26) of the six symmetrically arranged points of rotation (25, 26, 27, 28, 30, 31) are fixable on the movable part (T) via a first attachment (6), a second two (27, 28) of the six symmetrically arranged points of rotation (25, 26, 27, 28, 30, 31) are fixable on the other part (R) via a second attachment (6), the first attachment (6) and the second attachment (6) secure relative positions of the first and second two points of rotation (25, 26; 27, 28) in relation to one another, a first one (25) of the first two points of rotation (25, 26) secured by means of the first attachment (6) is connected, by means of a first lever (3) of the four levers (2, 3, 4, 5), to one (30) of a third two symmetrically arranged points of rotation (30, 31), which are present outside the first and second attachments (6), and a second one (26) of the first two points of rotation (25, 26) secured by means of the first attachment (6) is connected, by means of a second lever (5) of the four levers (2, 3, 4, 5), to another one (31) of the third two symmetrically arranged points of rotation (30, 31), which are present outside the first and second attachments (6), wherein the second lever (5) also incorporates the remaining one point of rotation (29), through which the mirror axis (S) runs, wherein, in the closed state, there is an enclosed angle of less than 155° between a connecting line between the remaining one point of rotation (29) having the mirror axis (S) and the other one point of rotation (31) of the third two symmetrically arranged points of rotation (30, 31) outside the first and second attachments (6) and a connecting line between the remaining one point of rotation (29) having the mirror axis and the second one point of rotation (26) of the first two points of rotation (25, 26) at the first attachment (6) for the second lever (5), wherein, in the closed state, an angle less than 20° is formed by (i) a first connecting line connecting the first two points of rotation (25, 26) of the first attachment (6), and (ii) a second connecting line connecting the point of rotation (30) which is present outside the first attachment (6) and a first one (25) of the first two points of rotation (25, 26).

2. The hinge (1) according to claim 1, wherein, in the closed state, the ratio between a length of a connecting line between the remaining one point of rotation (29) with the mirror axis (S) and one of the third two symmetrically arranged points of rotation (30 or 31) outside the first and second attachments (6) and a length of a connecting line between the remaining one point of rotation (29) with the mirror axis (S) and one of the first two or the second two symmetrically arranged points of rotation (26 or 27) on the first or second attachment (6) for the second lever (5) or a third lever (4) of the four levers (2, 3, 4, 5) is in a range between 0.8 and 1.2.

3. The hinge (1) according to claim 1, wherein the four levers (2, 3, 4, 5) engage in one another in such a way that recesses or apertures or openings (42) in three of the four levers (2, 3, 4, 5) are closed by one other of the four levers (2, 3, 4, 5).

4. The hinge (1) according to claim 1, in which two of the four levers (2, 3, 4, 5) engage with one other of the four levers (2, 3, 4, 5) at lever arm ends (15, 16, 17, 18) with projections (44) formed on the lever arm ends (15, 16, 17, 18) and an aligned bore is formed in the projections (44), into which a pin-shaped element is inserted to form an axis of rotation.

5. The hinge (1) according to claim 1, wherein each of the first and second attachments (6) has two pin-shaped elements which are guided through end openings or bores/bushings on respective ones of the four levers (2, 3, 4, 5) and the each attachment (6).

6. The hinge (1) according to claim 1, wherein a height of the four levers (2, 3, 4, 5) corresponds to a height of a receptacle (32) on each of the first and second attachments (6).

7. The hinge (1) according to claim 6, wherein the receptacle (32) comprises two struts (33, 34) on a base plate (35).

8. The hinge (1) according to claim 1, wherein three fingers (43) are provided on one of the four levers (2, 3, 4, 5), which fingers protrude through three openings (42) of another one of the four levers (2, 3, 4, 5).

9. The hinge (1) according to claim 8, wherein two of the openings (42) are open at an edge and one other of the openings (42) is closed at the edge.

10. The hinge (1) according to claim 1, wherein two of the four levers (2, 3, 4, 5) are straight and another two of the four levers (2, 3, 4, 5) are curved, the two curved levers (2, 3, 4, 5) are straight in portions in respective straight regions between lever arm ends and engage with each other in the respective straight regions, and an angle is formed between the respective straight regions and at least one of the lever arm ends.

11. The hinge (1) according to claim 1, wherein two of the four levers (2, 3, 4, 5) have lever arm ends which are offset from central regions of the respective two of the four levers (2, 3, 4, 5).

12. A door (T) with the hinge (1) according to claim 1 and a frame (R), wherein the hinge (1) is integrated at an end in the door (T) or in the frame (R).

13. The hinge (1) according to claim 1, wherein, in the closed state, an angle less than 20° is formed by (i) a third connecting line connecting the second two points of rotation (27, 28) of the second attachment (6), and (ii) a fourth connecting line connecting the point of rotation (31) which is present outside the second attachment (6) and a second one (28) of the second two points of rotation (27, 28).

* * * * *